US012754663B2

(12) United States Patent
Kong

(10) Patent No.: US 12,754,663 B2
(45) Date of Patent: Oct. 6, 2026

(54) TEXT CONTENT SELECTION METHOD AND APPARATUS

(71) Applicant: VIVO MOBILE COMMUNICATION CO., LTD., Dongguan (CN)

(72) Inventor: Peng Kong, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 224 days.

(21) Appl. No.: 18/597,161

(22) Filed: Mar. 6, 2024

(65) Prior Publication Data

US 2024/0272779 A1 Aug. 15, 2024

Related U.S. Application Data

(63) Continuation of application No. PCT/CN2022/117209, filed on Sep. 6, 2022.

(30) Foreign Application Priority Data

Sep. 7, 2021 (CN) ......................... 202111044549.7

(51) Int. Cl.
*G06F 3/04842* (2022.01)

(52) U.S. Cl.
CPC ................................ *G06F 3/04842* (2013.01)

(58) Field of Classification Search
CPC ... G06F 3/04842; G06F 3/0482; G06F 3/0481
See application file for complete search history.

(56) References Cited

U.S. PATENT DOCUMENTS

2015/0286729 A1* 10/2015 Kumar ................ G06F 16/9535
707/722

FOREIGN PATENT DOCUMENTS

| | | | |
|---|---|---|---|
| CN | 102902688 | A | 1/2013 |
| CN | 104808903 | A | 7/2015 |
| CN | 105005562 | A | 10/2015 |
| CN | 201711395093 | A * | 12/2017 |
| CN | 202011479600 | * | 12/2020 |
| CN | 112558811 | A | 3/2021 |
| CN | 113885743 | A | 1/2022 |

* cited by examiner

*Primary Examiner* — Cao H Nguyen
(74) *Attorney, Agent, or Firm* — The Webb Law Firm

(57) ABSTRACT

A text content selection method includes receiving a first input for target text in a first interface; in response to the first input, displaying a target information input box on the first interface; receiving a second input, where the second input is an input for at least one piece of key information in the target information input box; in response to the second input, displaying N sequence number identifiers on N pieces of content, where the N pieces of content are pieces of content corresponding to the at least one piece of key information in the target text; receiving a third input for M sequence number identifiers among the N sequence number identifiers; and in response to the third input, selecting, from the target text, and marking target content based on pieces of content corresponding to the M sequence number identifiers.

12 Claims, 6 Drawing Sheets

TEXT CONTENT SELECTION METHOD AND APPARATUS

CROSS-REFERENCE TO RELATED APPLICATIONS

This application is a Bypass Continuation Application of International Patent Application No. PCT/CN2022/117209, filed Sep. 6, 2022, and claims priority to Chinese Patent Application No. 202111044549.7, filed Sep. 7, 2021, the disclosures of which are hereby incorporated by reference in their entireties.

BACKGROUND OF THE INVENTION

Field of the Invention

This application pertains to the field of communications technologies, and to a text content selection method and apparatus.

Description of Related Art

At present, when the user copy, forward, and search for text on the electronic device, the user can select and input text content, so that the electronic device can enlarge and display the text content selected by the user. In this way, the user can determine, based on the enlarged text content, whether the selected text content is text content required to be selected by the user.

However, when the screen of the electronic device is a curved screen, if a part of the text content to be selected by the user is located at a screen edge of the curved screen, when the finger of the user moves from a main screen area of the curved screen to the screen edge (that is, the curved surface part) of the curved screen, the electronic device cannot completely detect the input of the user, that is, an end position of an input detected by the electronic device is a boundary position between the main screen area and the curved surface part. As a result, the user cannot completely select the required text content, so that integrity and accuracy of the text selected on the electronic device are poor, and human-computer interaction experience is poor.

SUMMARY OF THE INVENTION

Embodiments of this application provide a text content selection method and apparatus.

According to a first aspect, an embodiment of this application discloses a text content selection method, where the text content selection method includes: receiving a first input of a user for target text in a first interface; in response to the first input, displaying a target information input box on the first interface, where the target information input box is used for the user to input key information; receiving a second input of the user, where the second input is an input of the user for at least one piece of key information in the target information input box; in response to the second input, displaying N sequence number identifiers on N pieces of content, where the N pieces of content are pieces of content corresponding to the at least one piece of key information in the target text, the N pieces of content are in a one-to-one correspondence with the N sequence number identifiers, and N is a positive integer; receiving a third input of the user for M sequence number identifiers among the N sequence number identifiers, where M is a positive integer less than or equal to N; and in response to the third input, selecting, from the target text, and marking target content based on pieces of content corresponding to the M sequence number identifiers.

According to a second aspect, an embodiment of this application provides a text content selection apparatus, and the text content selection apparatus includes: a receiving module, a display module, and a processing module. The receiving module is configured to receive a first input of a user for target text in a first interface. The display module is configured to: in response to the first input received by the receiving module, display a target information input box on the first interface, where the target information input box is used for the user to input key information. The receiving module is further configured to receive a second input of the user, where the second input is an input of the user for at least one piece of first key information in the target information input box. The display module is further configured to display N sequence number identifiers on N pieces of content, where the N pieces of content are pieces of content corresponding to the at least one piece of key information in the target text, the N pieces of content are in a one-to-one correspondence with the N sequence number identifiers, and N is a positive integer. The receiving module is further configured to receive a third input of the user for M sequence number identifiers among the N sequence number identifiers, where M is a positive integer less than or equal to N. The processing module is configured to: in response to the third input received by the receiving module, select, from the target text, and mark target content based on pieces of content corresponding to the M sequence number identifiers.

According to a third aspect, an embodiment of this application provides an electronic device. The electronic device includes a processor, a memory, and a program or an instruction stored in the memory and executable on the processor, where the program or the instruction is executed by the processor to implement steps of the method according to the first aspect.

According to a fourth aspect, an embodiment of this application provides a non-transitory readable storage medium. The non-transitory readable storage medium stores a program or an instruction, and when the program or the instruction is executed by a processor, steps of the method according to the first aspect are implemented.

According to a fifth aspect, an embodiment of this application provides a chip. The chip includes a processor and a communications interface, the communications interface is coupled to the processor, and the processor is configured to run a program or an instruction to implement the method according to the first aspect.

According to a sixth aspect, an embodiment of this application provides a computer program product, where the computer program product is executed by at least one processor to implement the method according to the first aspect.

DESCRIPTION OF THE INVENTION

Figure 1:
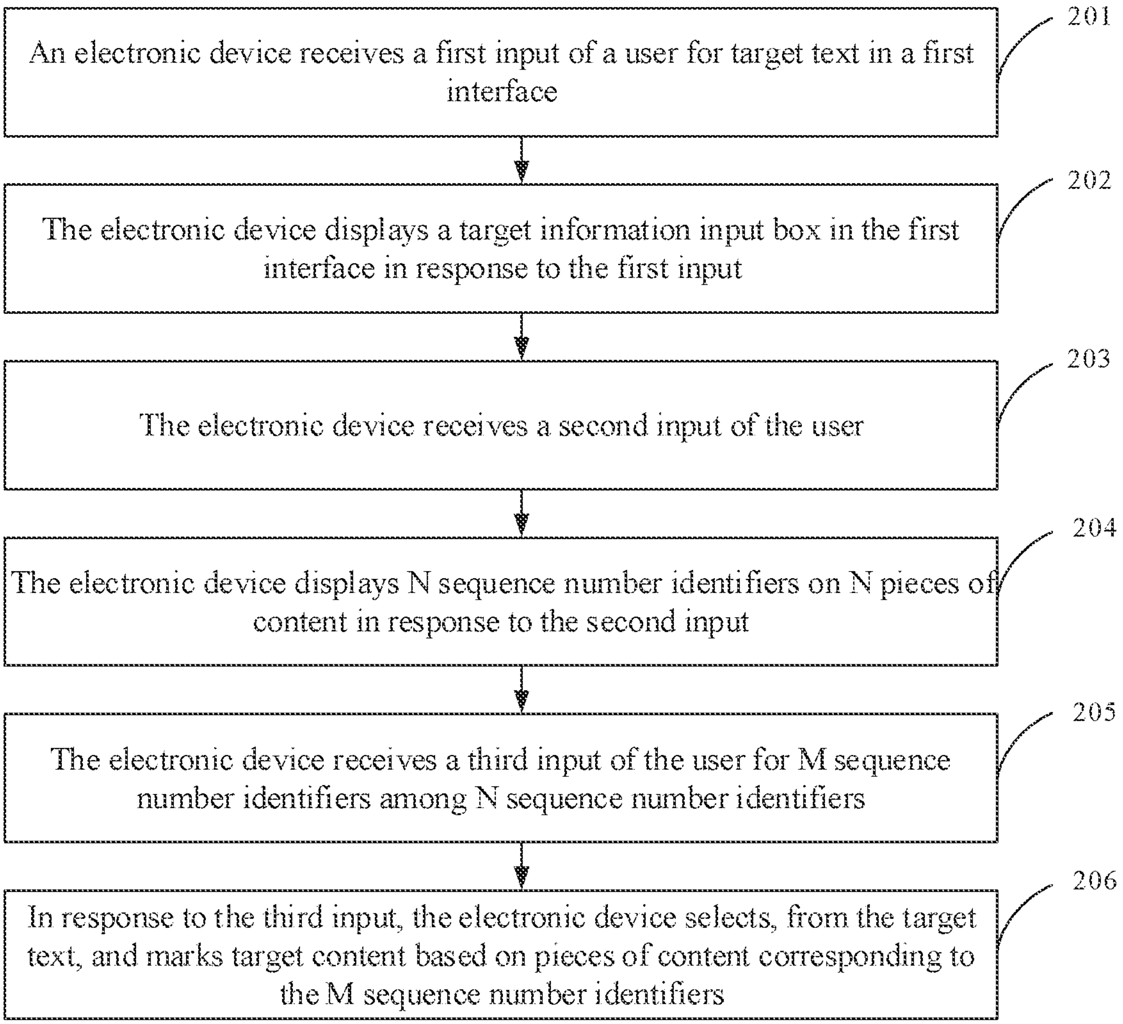
FIG. 1 is a flowchart of a text content selection method according to an embodiment of this application.

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein. Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

With reference to the accompanying drawings, the text content selection method provided in the embodiments of this application is described by using some embodiments and application scenarios thereof.

In this embodiment of this application, the user can input target text, so that the electronic device displays an information input box, and the user can input at least one piece of key information in the information input box. In this way, the electronic device can determine corresponding text content (namely, N pieces of content) in the target text based on the at least one piece of key information, and display N sequence number identifiers, to show a sequence of the N pieces of content to the user. Thus, the user can input M sequence number identifiers in the N sequence number identifiers, so that the text content (that is, the target content) required by the user can be selected by selecting M pieces of content.

In this solution, after the user triggers the electronic device to display the information input box, the user can directly input key information in the information input box, so that the electronic device can quickly locate corresponding text content in the target text based on the key information input by the user, and display sequence number identifiers corresponding to these pieces of text content, to show a sequence of these pieces of text content to the user. In this way, the user can directly input the sequence number identifier, so that the electronic device can quickly and accurately select content corresponding to the sequence number identifier input by the user, that is, the text content required by the user, without sliding input of the user on the screen of the electronic device to select the required text content. Therefore, the solution of this application can be used to avoid the problem that the electronic device cannot completely detect the input of the user when the finger of the user moves from the main screen area to the curved surface part, thereby ensuring integrity and accuracy of the text content selected on the electronic device and improving the human-computer interaction experience.

Embodiments of this application provide a text content selection method, and FIG. 1 is a flowchart of a text content selection method according to an embodiment of this application. As shown in FIG. 1, the text content selection method provided in this embodiment of this application may include the following step 201 to step 206.

Step 201. An electronic device receives a first input of a user for target text in a first interface.

In this embodiment of this application, the electronic device displays the first interface, the target text is displayed in the first interface, and the user can perform a first input for the target text to trigger the electronic device to display the information input box, so that the user can input key information to select the text content in the target text.

Optionally, in this embodiment of this application, the target text includes at least one of the following: text content, picture content, emotion icon, application icon, mark, or the like.

Optionally, in this embodiment of this application, the first interface may be a desktop of the electronic device, or an interface of an application in the electronic device, or a status bar interface/notification bar interface of the electronic device.

Optionally, in this embodiment of this application, the first input may be a touch and hold input, a click input (for example, a double-click input or an input for a preset number of times), a slide input or a preset trajectory input of the user for the target text in the first interface. This may be specifically determined according to an actual use requirement, and is not limited in this embodiment of this application.

Optionally, in this embodiment of this application, before performing the first input, the user can trigger the electronic device to start a text selection function through the input in the application of "Settings"; or the user can perform an input for a control in the first interface before performing the first input, so that the electronic device can start the text selection function. After the text selection function is started, the electronic device is allowed to select the text content through key information.

Step 202. The electronic device displays a target information input box in the first interface in response to the first input.

In this embodiment of this application, the target information input box is used for the user to input the key information.

Optionally, in this embodiment of this application, the electronic device can display the target information input box in a blank area of the first interface; or the electronic device can display the target information input box in a floating form on the first interface.

It should be noted that the above blank area is an area where no content is displayed in the first interface.

Optionally, in this embodiment of this application, the key information may include at least one of the following: a keyword, keywords, key letters, key sentences, key symbols, key patterns, or the like.

Optionally, in this embodiment of this application, the target information input box includes a first information input box and a second information input box, where the first information input box is used for the user to input one piece of key information, and the second information input box is used for the user to input another piece of key information.

Figure 2:
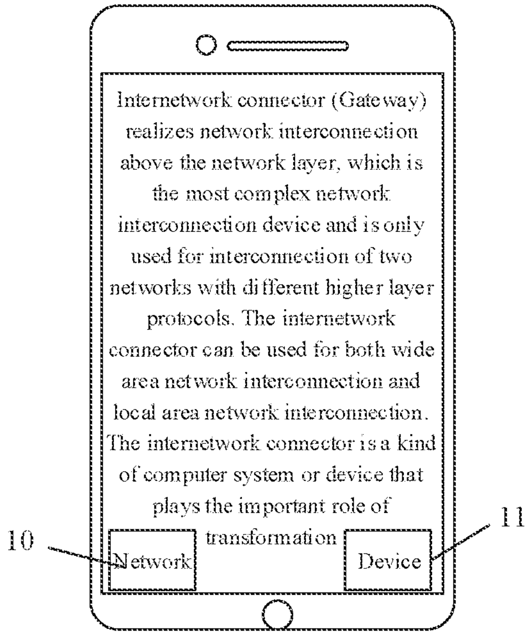
FIG. 2 is a first schematic diagram of an example of an interface of a mobile phone according to an embodiment of this application.

For example, the following uses an example in which the electronic device is a mobile phone for description. As shown in FIG. 2, the mobile phone displays the first interface, and the target text is displayed in the first interface. After the user performs a first input for the target text, the mobile phone can display target information input boxes (for example, an input box 10 and an input box 11). The input box 10 is used for the user to input one piece of key information (for example, the Chinese keyword "wang", which is represented by "network" hereinafter based on the meaning for ease of description), and the input box 11 is used for the user to input another piece of key information (for example, the Chinese keyword "bei", which is represented by "device" hereinafter based on the meaning for ease of description).

Optionally, in this embodiment of this application, the target information input boxes include two input areas, one input area is used for the user to input one piece of key information, and the other input area is used for the user to input another piece of key information.

Step 203. The electronic device receives a second input of the user.

In this embodiment of this application, the second input is an input of the user for at least one piece of key information in the target information input box.

Optionally, in this embodiment of this application, the second input is an input of the user for the first key information and the second key information in the target information input box.

Optionally, in this embodiment of this application, the second input includes a first sub-input and a second sub-input, where the first sub-input is an input of the user for the first key information in the first information input box, and the second sub-input is an input of the user for the second key information in the second information input box.

Optionally, in this embodiment of this application, the first sub-input may be an input of the user for the first key information in an input area of the target information input box, and the second sub-input may be an input of the user for the second key information in another input area of the target information input box.

Step 204. The electronic device displays N sequence number identifiers on N pieces of content in response to the second input.

In this embodiment of this application, the N pieces of content are pieces of content corresponding to at least one piece of key information in the target text, the N pieces of content are in one-to-one correspondence with the N sequence number identifiers, and N is a positive integer.

In this embodiment of this application, the electronic device can search for, based on at least one piece of key information, content corresponding to/matching each piece of key information from the target text, to search for N pieces of content corresponding to the at least one piece of key information. Then, the electronic device displays N sequence number identifiers for the N pieces of content, that is, one sequence number identifier is displayed for each of the N pieces of content, and each sequence number identifier is used to indicate a sequence number of one of the N pieces of content (that is, a sequence of one piece of content among the N pieces of content).

It should be noted that pieces of content corresponding to all pieces of key information in the at least one piece of key information are all different; pieces of content corresponding to a part of pieces of key information in the at least one piece of key information are the same, while pieces of content corresponding to the other part of pieces of key information are different; or pieces of content corresponding to all pieces of key information in the at least one piece of key information are all the same.

Optionally, in this embodiment of this application, the at least one piece of key information includes first key information and second key information. The electronic device can determine at least one piece of first content matching the first key information from the target text and mark the at least one piece of first content, and the electronic device can determine at least one piece of second content matching the second key information from the target text and mark the at least one piece of second content.

In this embodiment of this application, the electronic device can perform text parsing on the target text to search for content matching the first key information and content matching the second key information from the target text. It should be noted that the first content matching the first key information can be understood as: the first content is identical or similar to the first key information, that is, the similarity between the first content and the first key information is greater than or equal to the preset similarity. The second content matching the second key information can be understood as: the second content is identical or similar to the second key information, that is, the similarity between the second content and the second key information is greater than or equal to the preset similarity.

Optionally, in this embodiment of this application, the electronic device can sort the N pieces of content according to a display order of the N pieces of content in the target text (that is, each piece of content corresponds to one sequence number identifier) to display the N sequence number identifiers.

Optionally, in this embodiment of this application, the electronic device can mark at least one piece of first content and at least one piece of second content in different manners; or the electronic device can mark at least one piece of first content and at least one piece of second content with different parameters (such as color) in the same manner.

Optionally, in this embodiment of this application, the electronic device may mark at least one piece of first content with a third color and mark at least one piece of second content with a fourth color.

Optionally, in this embodiment of this application, the foregoing step 204 can be implemented by performing the following step 204*a*.

Step 204*a*. In response to the second input, the electronic device displays at least one group of sequence number identifiers on the N pieces of content in at least one display manner to display the N sequence number identifiers.

In this embodiment of this application, each group of the at least one group of sequence number identifiers is used to indicate a sequence of at least one piece of content corresponding to one piece of key information, and each group of sequence number identifiers corresponds to a display manner.

It can be understood that N pieces of content correspond to N sequence number identifiers, and same content in the N pieces of content corresponds to a same group of sequence number identifiers. The electronic device can group the N pieces of content based on whether there is the same content among the N pieces of content, and performs ranking for each group of pieces of content, that is, one group of sequence number identifiers are displayed in one display manner for each group of pieces of content, and a group of sequence number identifiers is used to indicate a sequence of each piece of content in the group of pieces of content. In other words, the number of groups of the content is equal to the number of groups of the sequence number identifier, and the number of groups of the sequence number identifier is equal to the number of types of the display manner.

Optionally, in this embodiment of this application, the at least one display manner is at least one color display manner, that is, different color display manners are used to display at least one group of sequence number identifiers; or the at least one display manner includes at least one of the following: color display manner, flashing display manner, protruding display manner, or the like.

Figure 3:
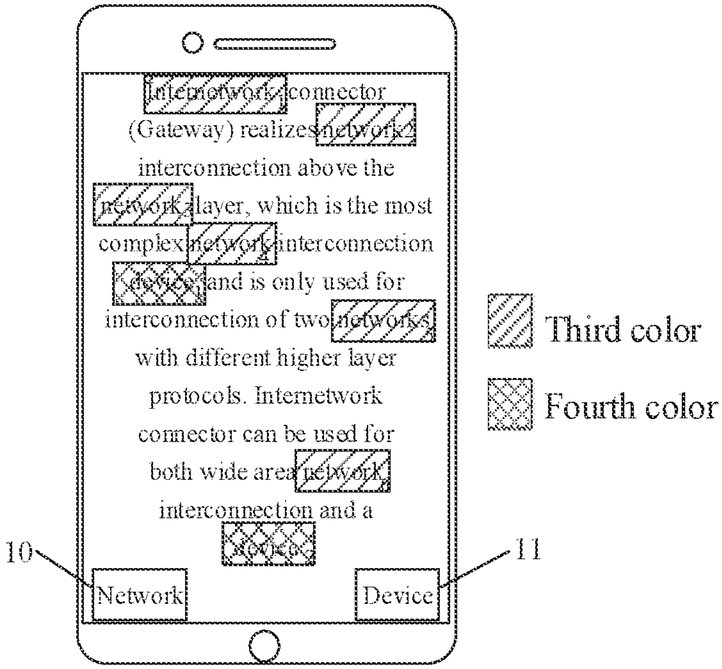
FIG. 3 is a second schematic diagram of an example of an interface of a mobile phone according to an embodiment of this application.

For example, with reference to FIG. 2, as shown in FIG. 3, after the user performs a second input (namely, input a keyword "network" and a keyword "device"), the mobile phone can be used to search for content corresponding to the keyword "network" (namely, a plurality of words "network") and content corresponding to the keyword "device" (namely, a plurality of words "device") from the target text. In addition, a third color is used to display a group of sequence number identifiers (for example, a number identifier "1" to a number identifier "4"), and the group of sequence number identifiers are used to indicate a sequence of each word "network" in the plurality of words "network". A fourth color is used to display another group of sequence number identifiers (for example, the number identifier "1" and the number identifier "2"), and the other group of sequence number identifiers are used to indicate a sequence of each word "device" in the plurality of words "device". It should be noted that the third color and the fourth color are indicated by using two different fillers in FIG. 3.

In this embodiment of this application, the electronic device can display different groups of sequence number identifiers in different display manners, so that the user can intuitively determine, based on different display manners, sequence number identifiers corresponding to different groups of content. In this way, the user can directly select the sequence number for each group of content, so that the user can quickly and accurately select the required text content.

Step 205. The electronic device receives a third input of the user for M sequence number identifiers among N sequence number identifiers.

M is a positive integer less than or equal to N.

In this embodiment of this application, the third input is used to trigger the electronic device to select the target content from the target text based on pieces of content corresponding to the M sequence number identifiers.

Optionally, in an implementation of this embodiment of this application, the third input may be a selection input (for example, a click input) of the user for the M sequence number identifiers in the target text.

Optionally, in another implementation of this embodiment of this application, the first interface further includes a sequence number identifier input box, and the third input may be an input of the user for the M sequence number identifiers in the sequence number identifier input box.

Optionally, in this embodiment of this application, after receiving the first input of the user, the electronic device can display the target information input box and the sequence number identifier input box on the first interface.

Figure 4:
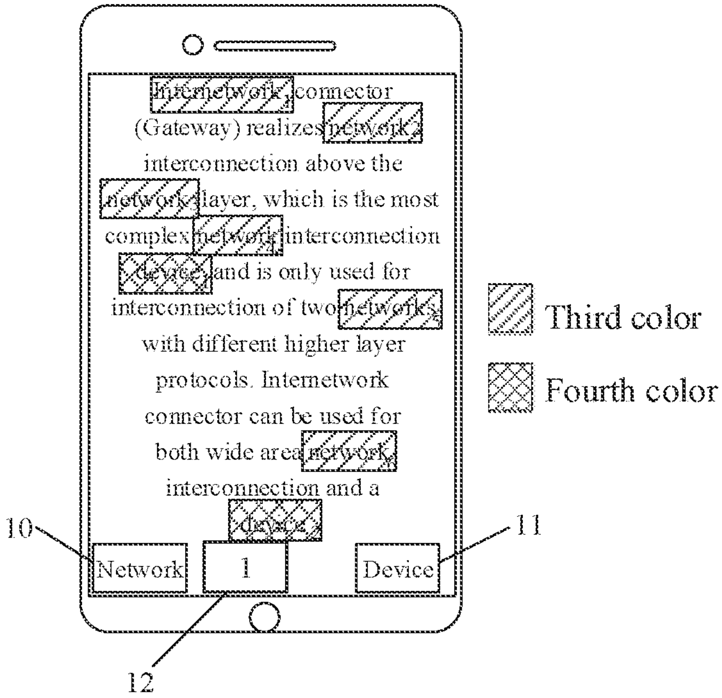
FIG. 4 is a third schematic diagram of an example of an interface of a mobile phone according to an embodiment of this application.

For example, with reference to FIG. 3, as shown in FIG. 4, the mobile phone displays N sequence number identifiers and a sequence number identifier input box 12 on the first interface; and the user can input M sequence number identifiers (for example, a number identifier "1") in the sequence number identifier input box 12, so that the mobile phone can select content corresponding to the number identifier "1".

Optionally, in another implementation of this embodiment of this application, the first interface further includes a sequence number control. Before step 205, the text content selection method provided in this embodiment of this application further includes the following step 301 to step 302.

Step 301. The electronic device receives a fourth input of the user for the sequence number control.

Optionally, in this embodiment of this application, the fourth input is a selection input (for example, a click input) of the user for the sequence number control.

Optionally, in this embodiment of this application, the electronic device can display the target information input box and the sequence number control in the first interface after receiving the first input of the user.

Step 302. The electronic device displays a target window in response to the fourth input.

In this embodiment of this application, the target window includes N sequence number identifiers. In this implementation, the third input is an input (for example, a selection input for the M sequence number identifiers) of the user for the M sequence number identifiers in the target window.

It can be understood that after the user performs a fourth input for the sequence number control, the electronic device can display N sequence number identifiers through the target display window, and then the user can perform a third input for the M sequence number identifiers among the N sequence number identifiers, to trigger the electronic device to select pieces of content corresponding to the M sequence number identifiers.

Figure 5:
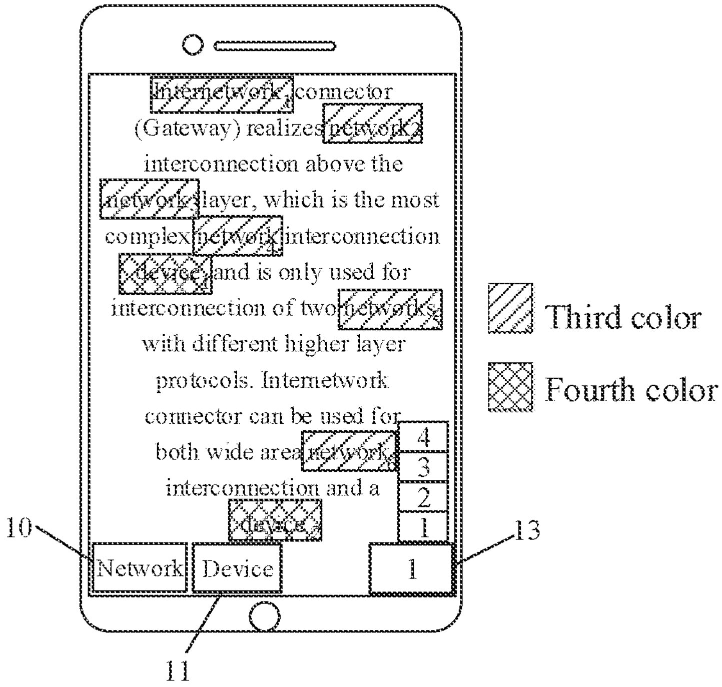
FIG. 5 is a fourth schematic diagram of an example of an interface of a mobile phone according to an embodiment of this application.

For example, with reference to FIG. 3, as shown in FIG. 5, the mobile phone displays N sequence number identifiers and a sequence number control 13 on the first interface. The user can input the sequence number control 13, so that the mobile phone displays N sequence number identifiers (for example, a number identifier "1" to a number identifier "4"), and then the user can perform a selection input for the M sequence number identifiers (for example, the number identifier "1") among the N sequence number identifiers, so that the mobile phone can select content corresponding to the number identifier "1".

Step 206. In response to the third input, the electronic device selects, from the target text, and marks target content based on pieces of content corresponding to the M sequence number identifiers.

In this embodiment of this application, the electronic device can determine, based on the pieces of content corresponding to the M sequence number identifiers (hereinafter referred to as M pieces of content), a start position and an end position of content to be selected, so as to select text content from the start position and stop selecting the text content at the end position, to obtain the target content.

Optionally, in this embodiment of this application, step 206 may be implemented by using the following step 206*a* or step 206*b*.

Step 206*a*. In response to the third input, the electronic device determines, in a case that the M sequence number identifiers are one sequence number identifier, all pieces of content between content corresponding to the one sequence number identifier and content corresponding to a last sequence number identifier among the N sequence number identifiers as the target content, and marks the target content.

It can be understood that when the user selects one sequence number identifier through the third input, that is, when the user selects one piece of content from N pieces of content, the electronic device can use the one piece of content as the start position of the content to be selected, and use a last piece of content among the N pieces of content as the end position of the content to be selected, so as to start selecting the text content from the start position and stop selecting the text content at the end position, to obtain the target content, that is, the target content includes the content at the start position, content between the start position and the end position, and the content at the end position.

Step 206*b*. In response to the third input, the electronic device determines, in a case that the M sequence number identifiers are a plurality of sequence number identifiers, all pieces of content between content corresponding to a first sequence number identifier among the plurality of sequence number identifiers and content corresponding to a last sequence number identifier among the plurality of sequence number identifiers as the target content, and marks the target content.

It can be understood that when the user selects a plurality of sequence number identifiers through the third input, that is, when the user selects a plurality of pieces of content from N pieces of content, the electronic device can use a first piece of content among the plurality of pieces of content as the start position of the content to be selected, and use a last piece of content among the plurality of pieces of content as the end position of the content to be selected, so as to start selecting the text content from the start position and stop selecting the text content at the end position, to obtain the target content, that is, the target content includes the content at the start position, content between the start position and the end position, and the content at the end position.

Optionally, in this embodiment of this application, the at least one piece of key information includes first key information and second key information. Content corresponding to a first sequence number identifier is first content matching the first key information, and content corresponding to a last sequence number identifier is second content matching the second key information. The electronic device can determine all pieces of text content from the first content to the second content as the target content, that is, the target content includes the first content, the content between the first content and the second content, and the second content.

Figure 6:
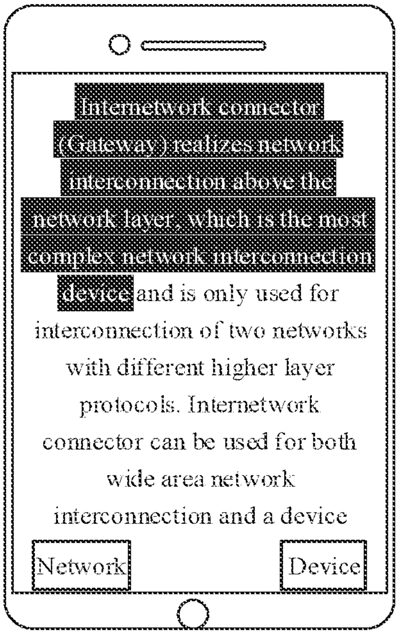
FIG. 6 is a fifth schematic diagram of an example of an interface of a mobile phone provided by an embodiment of this application.

For example, with reference to FIG. 3, as shown in FIG. 6, the content corresponding to the first sequence number identifier is the first content (for example, the word "network" corresponding to the number identifier "1"), and the content corresponding to the last sequence number identifier is the second content (for example, the word "device" corresponding to the number identifier "1"). The mobile phone can determine all pieces of text content between the first content and the second content as the target content, that is, the target content includes the word "network" corresponding to the number identifier "1", all pieces of content between the word "network" and the word "device" corresponding to the number identifier "1", and the word "device" corresponding to the number identifier "1". In addition, the mobile phone can mark the target content to inform the user of the text content selected from the target text.

In this embodiment of this application, the electronic device can directly determine, based on at least one piece of key information, the content corresponding to the first sequence number identifier and the content corresponding to the last sequence number identifier from the target text, so as to quickly and accurately determine, based on the two pieces of content, the text content required to be selected by the user, which ensures integrity and accuracy of the text content selected on the electronic device.

Optionally, in this embodiment of this application, in a case that the M sequence number identifiers are a plurality of sequence number identifiers, and the content corresponding to the first sequence number identifier in the plurality of sequence number identifiers is the same as the content corresponding to the last sequence number identifier, "determine all pieces of content between content corresponding to a first sequence number identifier among the plurality of sequence number identifiers and content corresponding to a last sequence number identifier among the plurality of sequence number identifiers as the target content, and marks the target content" in step 206*b* may be implemented by using the following step 206*b*1 to step 206*b*3.

Step 206*b*1. The electronic device splits the content corresponding to the first sequence number identifier to obtain a first part of content and a second part of content, and marks the first part of content with a first color.

Optionally, in this embodiment of this application, the electronic device can split the content corresponding to the first sequence number identifier into two parts of content based on a length of the content corresponding to the first sequence number identifier, a Chinese character font form structure, or the like.

Step 206*b*2. The electronic device splits the content corresponding to the last sequence number identifier to obtain a third part of content and a fourth part of content, and marks the fourth part of content with a second color.

Optionally, in this embodiment of this application, the electronic device can split the content corresponding to the last sequence number identifier into two parts of content based on a length of the content corresponding to the last sequence number identifier, a Chinese character font form structure, or the like.

Step 206*b*3. The electronic device determines all pieces of content between the first part of content and the fourth part of content as the target content, and marks the target content.

In this embodiment of this application, the first part of content and the fourth part of content are different pieces of content, and the first part of content and the fourth part of content can form the content corresponding to the first sequence number identifier/the content corresponding to the last sequence number identifier.

In this embodiment of this application, the at least one piece of key information includes first key information and second key information. Content corresponding to a first sequence number identifier is first content matching the first key information, and content corresponding to a last sequence number identifier is second content matching the second key information. The electronic device can separately divide the first content and the second content into two parts of content equally, and the electronic device can select a part of the first content as content determined by the first key information and a part of the second content as content determined by the second key information.

Figure 7:
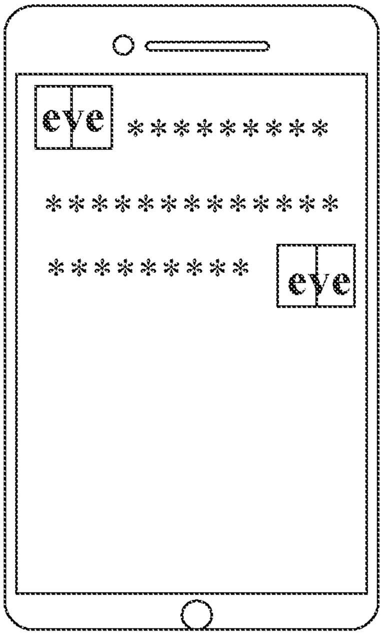
FIG. 7 is a sixth schematic diagram of an example of an interface of a mobile phone provided by an embodiment of this application.

For example, as shown in FIG. 7, both the first content and the second content determined by the mobile phone are Chinese character "Ge", namely, "every", which is represented by "eve" hereinafter based on the shape for ease of description. The mobile phone can equally divide the word "eve" corresponding to the first content into two parts on the left and right, and equally divide the word "eve" corresponding to the second content into two parts on the left and right. Then the mobile phone can select the left part of the word "eve" corresponding to the first content and the right part of the word "eve" corresponding to the second content, to determine the target content based on the left part and the right part.

Optionally, in this embodiment of this application, the first part of content and the fourth part of content can be independently selected by the electronic device or selected by the user through the selection input.

In this embodiment of this application, when the electronic device determines, based on the key information input by the user, that the content corresponding to the first sequence number identifier is the same as the content corresponding to the last sequence number identifier, the electronic device separately splits the content corresponding to the first sequence number identifier and the content corresponding to the last sequence number identifier to determine two different content parts from the split content, thus accurately determining the target content based on the two different content parts, and ensuring accuracy and flexibility of the text content selected on the electronic device. Optionally, in this embodiment of this application, the electronic device can mark the target content in a preset manner, and the preset manner is any one of the following: color marking manner, flashing marking manner, protruding display marking manner, and the like.

The embodiments of this application provide a text content selection method, where the electronic device can display the target information input box based on the first input of the user for the target text, so that the user can input at least one piece of key information in the target information input box. In this way, the electronic device can determine corresponding text content (namely, N pieces of content) in the target text based on the at least one piece of key information, and display N sequence number identifiers, to show a sequence of the N pieces of content to the user. Thus, the user can input M sequence number identifiers in the N sequence number identifiers, so that the text content (that is, the target content) required by the user can be selected by selecting M pieces of content. In this solution, after the user triggers the electronic device to display the information input box, the user can directly input key information in the information input box, so that the electronic device can quickly locate corresponding text content in the target text based on the key information input by the user, and display sequence number identifiers corresponding to these pieces of text content, to show a sequence of these pieces of text content to the user. In this way, the user can directly input the sequence number identifier, so that the electronic device can quickly and accurately select content corresponding to the sequence number identifier input by the user, that is, the text content required by the user, without sliding input of the user on the screen of the electronic device to select the required text content. Therefore, the solution of this application can be used to avoid the problem that the electronic device cannot completely detect the input of the user when the finger of the user moves from the main screen area to the curved surface part, thereby ensuring integrity and accuracy of the text content selected on the electronic device and improving the human-computer interaction experience. Optionally, in this embodiment of this application, the first interface further includes a selection control. Before "select, from the target text, and mark target content based on pieces of content corresponding to the M sequence number identifiers" in step 206, the text content selection method provided in this embodiment of this application further includes the following step 401 and step 402, and the step 206 can be implemented by using the following step 206*c*.

Step 401. In response to the third input, the electronic device marks the pieces of content corresponding to the M sequence number identifiers respectively.

In this embodiment of this application, the electronic device can mark the pieces of content corresponding to the M sequence number identifiers in different manners.

Optionally, in this embodiment of this application, the electronic device can mark the pieces of content corresponding to the M sequence number identifiers in a preset mark manner, and the preset mark manner includes at least one of the following: color marking manner, flashing marking manner, protruding display marking manner, or the like.

For example, the electronic device may use different colors to respectively mark the first content corresponding to the first key information and the second content corresponding to the second key information.

Step 402. The electronic device receives a fifth input of the user for the selection control.

In this embodiment of this application, the selection control is used to select the target content.

Optionally, in this embodiment of this application, the fifth input is a selection input (for example, a click input) of the user for the selection control.

Optionally, in this embodiment of this application, the electronic device can display the target information input box and the selection control on the first interface after receiving the first input of the user.

Figure 8:
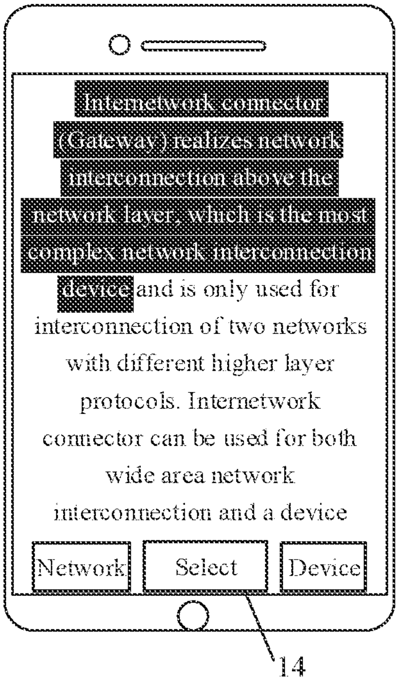
FIG. 8 is a seventh schematic diagram of an example of an interface of a mobile phone according to an embodiment of this application.

For example, with reference to FIG. 6, as shown in FIG. 8, the mobile phone displays a selection control 14 on the first interface, and the user can input this selection control 14, so that the mobile phone can determine all pieces of content between the word "network" corresponding to the number identifier "1" and the word "device" corresponding to the number identifier "1" as the target content.

Step 403. In response to the fifth input, the electronic device selects, from the target text, and marks target content based on pieces of content corresponding to the M sequence number identifiers.

In this embodiment of this application, after the electronic device marks the pieces of content corresponding to the M sequence number identifiers, the user can enable the electronic device to quickly select the target content by performing the fifth input for the selection control, thus improving integrity and accuracy of the text content selected on the electronic device.

Optionally, in this embodiment of this application, the user can also input the pieces of content corresponding to the M sequence number identifiers by sliding in the target text, so as to trigger the electronic device to select and mark the target content. For example, the user can slide from the content corresponding to the first sequence number identifier among the M sequence number identifier to the content corresponding to the last sequence number identifier.

Optionally, in this embodiment of this application, after selecting the target content, the electronic device can display an editing control on the first interface, such as copy control, share control, search control, cut control, and the like, so that the user can edit and input the target content through the editing control to realize an editing operation on the target content.

It should be noted that the text content selection method provided in this embodiment of this application may be performed by an electronic device or a text content selection apparatus, or a control module that is in the text content selection apparatus and that is configured to perform the text content selection method. In this embodiment of this application, the text content selection apparatus provided in this embodiment of this application is described by using an example in which the text content selection apparatus performs the text content selection method.

Figure 9:
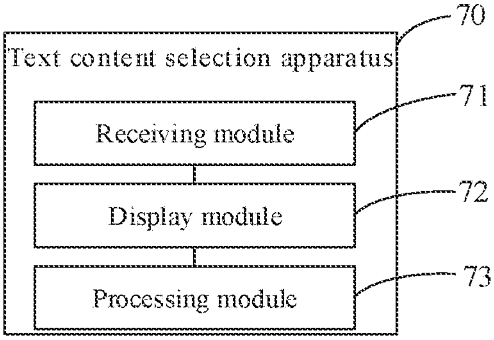
FIG. 9 is a schematic diagram of a structure of a text content selection apparatus according to an embodiment of this application.

FIG. 9 is a possible schematic diagram of a structure of a text content selection apparatus according to an embodiment of this application. As shown in FIG. 9, the text content selection apparatus 70 may include a receiving module 71, a display module 72, and a processing module 73.

The receiving module 71 is configured to receive a first input of a user for target text in a first interface. The display module 72 is configured to: in response to the first input received by the receiving module 71, display a target information input box on the first interface, where the target information input box is used for the user to input key information. The receiving module 71 is further configured to receive a second input of the user, where the second input is an input of the user for at least one piece of first key information in the target information input box. The display module 72 is further configured to display N sequence number identifiers on N pieces of content, where the N pieces of content are pieces of content corresponding to the at least one piece of key information in the target text, the N pieces of content are in a one-to-one correspondence with the N sequence number identifiers, and N is a positive integer. The receiving module 71 is further configured to receive a third input of the user for M sequence number identifiers among the N sequence number identifiers, where M is a positive integer less than or equal to N. The processing module 73 is configured to: in response to the third input received by the receiving module 71, select, from the target text, and mark target content based on pieces of content corresponding to the M sequence number identifiers.

In a possible implementation, the processing module 73 is configured to: in a case that the M sequence number identifiers are one sequence number identifier, determine all pieces of content between content corresponding to the one sequence number identifier and content corresponding to a last sequence number identifier among the N sequence number identifiers as the target content, and marks the target content; or in a case that the M sequence number identifiers are a plurality of sequence number identifiers, determine all pieces of content between content corresponding to a first sequence number identifier among the plurality of sequence number identifiers and content corresponding to a last sequence number identifier among the plurality of sequence number identifiers as the target content, and marks the target content.

In a possible implementation, the content corresponding to the first sequence number identifier is the same as the content corresponding to the last sequence number identifier, the processing module 73 is configured to: split the content corresponding to the first sequence number identifier to obtain a first part of content and a second part of content, and mark the first part of content with a first color; split the content corresponding to the last sequence number identifier to obtain a third part of content and a fourth part of content, and mark the fourth part of content with a second color; and determine all pieces of content between the first part of content and the fourth part of content as the target content.

In a possible implementation, the first interface further includes a sequence number control. The receiving module 71 is further configured to: before receiving a third input of the user for M sequence number identifiers among the N sequence number identifiers, receive a fourth input of the user for the sequence number control. The display module 72 is further configured to display a target window in response to the fourth input received by the receiving module 71, where the target window includes the N sequence number identifiers, and the fourth input is an input of the user for the M sequence number identifiers in the target window.

In a possible implementation, the first interface further includes a selection control; and the processing module 73 is further configured to mark the pieces of content corresponding to the M sequence number identifiers respectively. The receiving module 71 is further configured to receive a fifth input of the user for the selection control. The processing module 73 is configured to: in response to the fifth input received by the receiving module 71, select, from the target text, and mark the target content based on the pieces of content corresponding to the M sequence number identifiers.

An embodiment of this application provides a text content selection apparatus, where after the user triggers the text content selection apparatus to display the information input box, the user can directly input key information in the information input box, so that the text content selection apparatus can quickly locate corresponding text content in the target text based on the key information input by the user, and display sequence number identifiers corresponding to these pieces of text content, to show a sequence of these pieces of text content to the user. In this way, the user can directly input the sequence number identifier, so that the text content selection apparatus can quickly and accurately select content corresponding to the sequence number identifier input by the user, that is, the text content required by the user, without sliding input of the user on the screen of the text content selection apparatus to select the required text content. Therefore, the solution of this application can be used to avoid the problem that the text content selection apparatus cannot completely detect the input of the user when the finger of the user moves from the main screen area to the curved surface part, thereby ensuring integrity and accuracy of the selected text content and improving the human-computer interaction experience.

The text content selection apparatus in this embodiment of this application can be an apparatus, or a component, an integrated circuit, or a chip in an electronic device. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network attached storage (NAS), a personal computer (PC), a television (TV), a teller machine, a self-service machine, or the like. This is not specifically limited in the embodiments of this application.

The text content selection apparatus in this embodiment of this application may be an apparatus with an operating system. The operating system may be an Android operating system, an iOS operating system, or another possible operating system, which is not specifically limited in the embodiments of this application.

The text content selection apparatus provided in this embodiment of this application can implement the processes of the foregoing method embodiments, with the same technical effects achieved. To avoid repetition, details are not described herein again.

Figure 10:
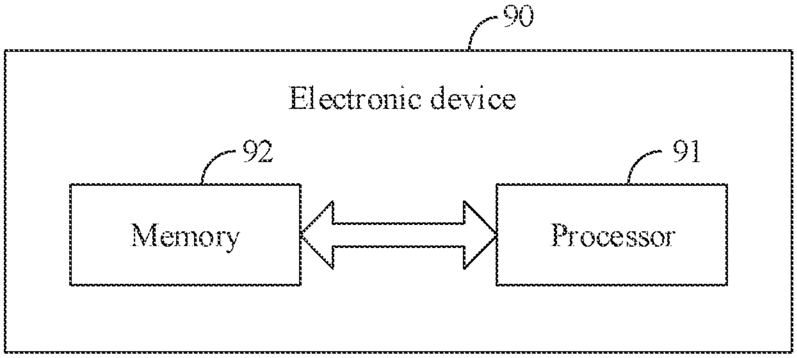
FIG. 10 is a first schematic diagram of a hardware structure of an electronic device according to an embodiment of this application.

Optionally, as shown in FIG. 10, an embodiment of this application further provides an electronic device 90, including a processor 91, a memory 92, and a program or instructions stored in the memory 92 and capable of running on the processor 91. When the program or the instructions are executed by the processor 91, the processes of the foregoing method embodiments are implemented, with the same technical effects achieved. To avoid repetition, details are not described herein again.

It should be noted that the electronic device in the embodiments of this application includes the foregoing mobile electronic device and the foregoing non-mobile electronic device.

Figure 11:
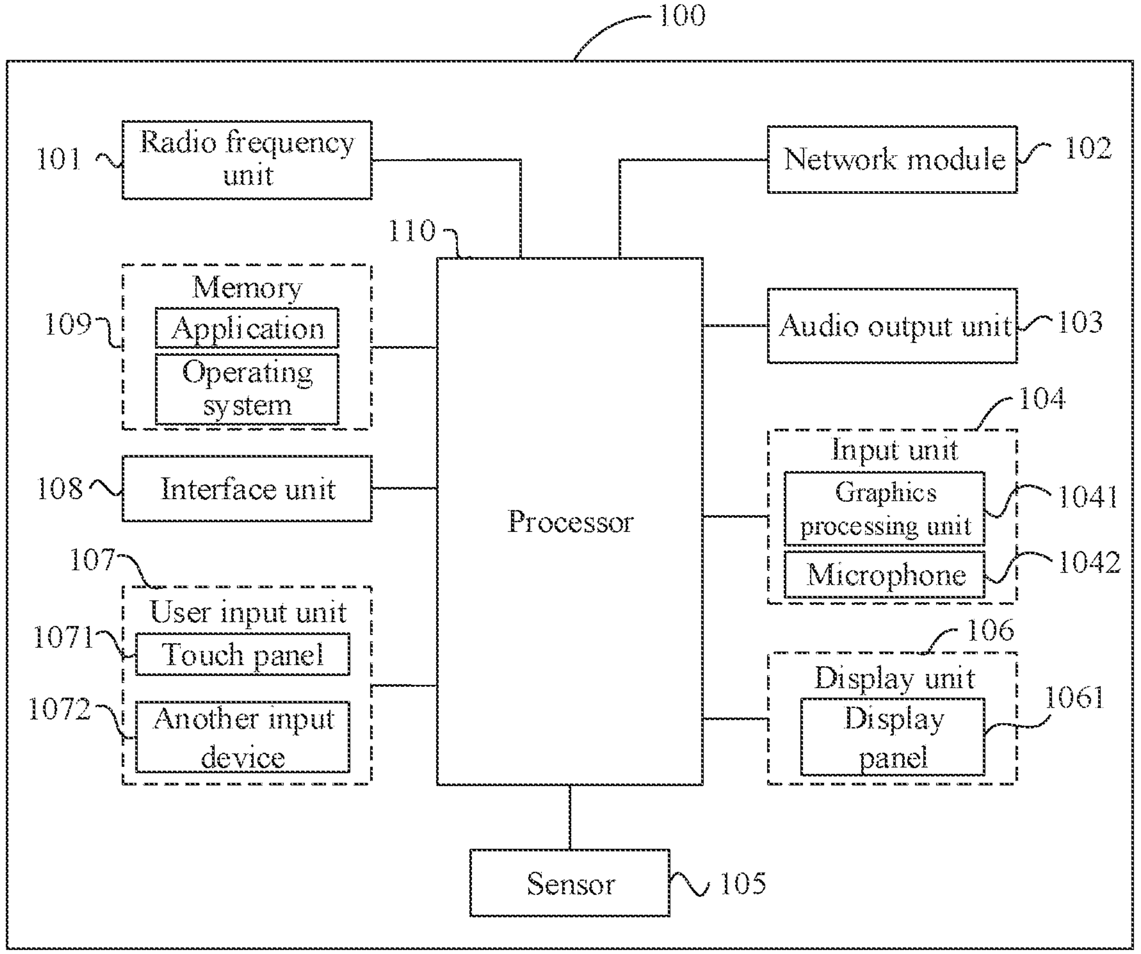
FIG. 11 is a second schematic diagram of a hardware structure of an electronic device according to an embodiment of this application.

FIG. 11 is a schematic diagram of a hardware structure of an electronic device according to an embodiment of this application.

An electronic device 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the electronic device 100 may further include a power supply (such as a battery) that supplies power to each component. The power supply may be logically connected to the processor 110 by using a power supply management system, to implement functions such as charging and discharging management, and power consumption management by using the power supply management system. The structure of the electronic device shown in FIG. 11 does not constitute a limitation on the electronic device. The electronic device may include components more or fewer than those shown in the diagram, a combination of some components, or different component arrangements. Details are not described herein.

The user input unit 107 is configured to receive a first input of a user for target text in a first interface. The display unit 106 is configured to: in response to the first input, display a target information input box on the first interface, where the target information input box is used for the user to input key information. The user input unit 107 is further configured to receive a second input of the user, where the second input is an input of the user for at least one piece of first key information in the target information input box. The display unit 106 is configured to: in response to the second input of the user input unit 107, display N sequence number identifiers on N pieces of content, where the N pieces of content are pieces of content corresponding to the at least one piece of key information in the target text, the N pieces of content are in a one-to-one correspondence with the N sequence number identifiers, and N is a positive integer; and the user input unit 107 is further configured to receive a third input of the user for M sequence number identifiers among the N sequence number identifiers, where M is a positive integer less than or equal to N. The processor 110 is configured to: in response to the third input of the user input unit 107, select, from the target text, and mark target content based on pieces of content corresponding to the M sequence number identifiers.

An embodiment of this application provides an electronic device, where after triggering the electronic device to display the information input box, the user can directly input key information in the information input box, so that the electronic device can quickly locate corresponding text content in the target text based on the key information input by the user, and display sequence number identifiers corresponding to these pieces of text content, to show a sequence of these pieces of text content to the user. In this way, the user can directly input the sequence number identifier, so that the electronic device can quickly and accurately select content corresponding to the sequence number identifier input by the user, that is, the text content required by the user, without sliding input of the user on the screen of the electronic device to select the required text content. Therefore, the solution of this application can be used to avoid the problem that the electronic device cannot completely detect the input of the user when the finger of the user moves from the main screen area to the curved surface part, thereby ensuring integrity and accuracy of the text content selected on the electronic device and improving the human-computer interaction experience.

Optionally, in this embodiment of this application, the processor 110 is configured to: in a case that the M sequence number identifiers are one sequence number identifier, determine all pieces of content between content corresponding to the one sequence number identifier and content corresponding to a last sequence number identifier among the N sequence number identifiers as the target content, and marks the target content; or in a case that the M sequence number identifiers are a plurality of sequence number identifiers, determine all pieces of content between content corresponding to a first sequence number identifier among the plurality of sequence number identifiers and content corresponding to a last sequence number identifier among the plurality of sequence number identifiers as the target content, and marks the target content.

Optionally, in this embodiment of this application, the content corresponding to the first sequence number identifier is the same as the content corresponding to the last sequence number identifier, the processor 110 is configured to: split the content corresponding to the first sequence number identifier to obtain a first part of content and a second part of content, and mark the first part of content with a first color; split the content corresponding to the last sequence number identifier to obtain a third part of content and a fourth part of content, and mark the fourth part of content with a second color; and determine all pieces of content between the first part of content and the fourth part of content as the target content.

Optionally, in this embodiment of this application, the first interface further includes a sequence number control; and the user input unit 107 is further configured to: before receiving a third input of the user for M sequence number identifiers among the N sequence number identifiers, receive a fourth input of the user for the sequence number control. The display unit 106 is further configured to display a target window in response to the fourth input of the user input unit 107, where the target window includes the N sequence number identifiers, and the fourth input is an input of the user for the M sequence number identifiers in the target window.

Optionally, in this embodiment of this application, the first interface further includes a selection control; and the processor 110 is further configured to: before selecting, from the target text, and marking target content based on pieces of content corresponding to the M sequence number identifiers, mark the pieces of content corresponding to the M sequence number identifiers respectively. The user input unit 107 is further configured to receive a fifth input of the user for the selection control. The processor 110 is configured to: in response to the fifth input of the user input unit 107, select, from the target text, and mark target content based on pieces of content corresponding to the M sequence number identifiers.

The electronic device provided in this embodiment of this application can implement the processes of the foregoing method embodiments, with the same technical effects achieved. To avoid repetition, details are not described herein again.

For a beneficial effect of each implementation in this embodiment, refer to a beneficial effect of a corresponding implementation in the foregoing method embodiment. To avoid repetition, details are not described herein again.

It should be understood that, in this embodiment of this application, the input unit 104 may include a graphics processing unit (GPU) 1041 and a microphone 1042. The graphics processing unit 1041 processes image data of a static picture or a video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein. The memory 109 may be configured to store a software program and various data, including but not limited to an application and an operating system. An application processor and a modem processor may be integrated into the processor 110, the application processor mainly processes an operating system, a user interface, an application, and the like, and the modem processor mainly processes wireless communication. It can be understood that, alternatively, the modem processor may not be integrated into the processor 110.

An embodiment of this application further provides a non-transitory readable storage medium. The non-transitory readable storage medium stores a program or instructions. When the program or the instructions are executed by a processor, the processes of the foregoing method embodiments are implemented, with the same technical effects achieved. To avoid repetition, details are not described herein again.

The processor is a processor in the electronic device in the foregoing embodiment. The non-transitory readable storage medium includes a non-transitory computer-readable storage medium such as a read-only memory (ROM), a random access memory (RAM), a magnetic disk, an optical disc, or the like.

An embodiment of this application further provides a chip. The chip includes a processor and a communications interface, the communications interface is coupled to the processor, and the processor is configured to run a program or an instruction to implement the processes of the foregoing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to existing technologies may be implemented in a form of a software product. The computer software product is stored in a non-transitory storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A text content selection method, comprising:

receiving a first input of a user for target text in a first interface;

in response to the first input, displaying a target information input box on the first interface, wherein the target information input box is used for the user to input key information;

receiving a second input of the user, wherein the second input is an input of the user for at least one piece of key information in the target information input box;

in response to the second input, displaying N sequence number identifiers on N pieces of content, wherein the N pieces of content are pieces of content corresponding to the at least one piece of key information in the target text, the N pieces of content are in a one-to-one correspondence with the N sequence number identifiers, and N is a positive integer;

receiving a third input of the user for M sequence number identifiers among the N sequence number identifiers, wherein M is a positive integer less than or equal to N; and in response to the third input, selecting, from the target text, and marking target content based on pieces of content corresponding to the M sequence number identifiers;

wherein the selecting, from the target text, and marking target content based on pieces of content corresponding to the M sequence number identifiers comprises:

in a case that the M sequence number identifiers are one sequence number identifier, determining all pieces of content between content corresponding to the one sequence number identifier and content corresponding to a last sequence number identifier among the N sequence number identifiers as the target content, and marking the target content; and in a case that the M sequence number identifiers are a plurality of sequence number identifiers, determining all pieces of content between content corresponding to a first sequence number identifier among the plurality of sequence number identifiers and content corresponding to a last sequence number identifier among the plurality of sequence number identifiers as the target content, and marking the target content;

wherein the content corresponding to the first sequence number identifier is the same as the content corresponding to the last sequence number identifier; and the determining all pieces of content between content corresponding to the first sequence number identifier among the plurality of sequence number identifiers and content corresponding to the last sequence number identifier among the plurality of sequence number identifiers as the target content comprises:

splitting the content corresponding to the first sequence number identifier to obtain a first part of content and a second part of content, and marking the first part of content with a first color;

splitting the content corresponding to the last sequence number identifier to obtain a third part of content and a fourth part of content, and marking the fourth part of content with a second color; and determining all pieces of content between the first part of content and the fourth part of content as the target content.

2. The method according to claim 1, wherein the first interface further comprises a sequence number control; and before the receiving a third input of the user for M sequence number identifiers among the N sequence number identifiers, the method further comprises:

receiving a fourth input of the user for the sequence number control; and displaying a target window in response to the fourth input, wherein the target window comprises the N sequence number identifiers, wherein the fourth input is an input of the user for the M sequence number identifiers in the target window.

3. The method according to claim 1, wherein the first interface further comprises a selection control;

before the selecting, from the target text, and marking target content based on pieces of content corresponding to the M sequence number identifiers, the method further comprises:

marking the pieces of content corresponding to the M sequence number identifiers respectively; and receiving a fifth input of the user for the selection control; and the selecting, from the target text, and marking target content based on pieces of content corresponding to the M sequence number identifiers comprises:

in response to the fifth input, selecting, from the target text, and marking the target content based on the pieces of content corresponding to the M sequence number identifiers.

4. A non-transitory readable storage medium, wherein the non-transitory readable storage medium stores a program or an instruction, and the program or the instruction, when executed by a processor of an electronic device, causes the electronic device to perform:

receiving a first input of a user for target text in a first interface;

in response to the first input, displaying a target information input box on the first interface, wherein the target information input box is used for the user to input key information;

receiving a second input of the user, wherein the second input is an input of the user for at least one piece of key information in the target information input box;

in response to the second input, displaying N sequence number identifiers on N pieces of content, wherein the N pieces of content are pieces of content corresponding to the at least one piece of key information in the target text, the N pieces of content are in a one-to-one correspondence with the N sequence number identifiers, and N is a positive integer;

receiving a third input of the user for M sequence number identifiers among the N sequence number identifiers, wherein M is a positive integer less than or equal to N; and in response to the third input, selecting, from the target text, and marking target content based on pieces of content corresponding to the M sequence number identifiers;

wherein to select from the target text and mark the target content, the electronic device is configured to perform:

in a case that the M sequence number identifiers are one sequence number identifier, determining all pieces of content between content corresponding to the one sequence number identifier and content corresponding to a last sequence number identifier among the N sequence number identifiers as the target content, and marking the target content; and in a case that the M sequence number identifiers are a plurality of sequence number identifiers, determining all pieces of content between content corresponding to a first sequence number identifier among the plurality of sequence number identifiers and content corresponding to a last sequence number identifier among the plurality of sequence number identifiers as the target content, and marking the target content;

wherein the content corresponding to the first sequence number identifier is the same as the content corresponding to the last sequence number identifier; and the program or the instruction, when executed by a processor of an electronic device, causes the electronic device to perform:

splitting the content corresponding to the first sequence number identifier to obtain a first part of content and a second part of content, and marking the first part of content with a first color;

splitting the content corresponding to the last sequence number identifier to obtain a third part of content and a fourth part of content, and marking the fourth part of content with a second color; and determining all pieces of content between the first part of content and the fourth part of content as the target content.

5. The non-transitory readable storage medium according to claim 4, wherein the first interface further comprises a sequence number control; and the program or the instruction, when executed by the processor, causes the electronic device to further perform:

receiving a fourth input of the user for the sequence number control; and displaying a target window in response to the fourth input, wherein the target window comprises the N sequence number identifiers, wherein the fourth input is an input of the user for the M sequence number identifiers in the target window.

6. The non-transitory readable storage medium according to claim 4, wherein the first interface further comprises a selection control; and the program or the instruction, when executed by the processor, causes the electronic device to further perform:

marking the pieces of content corresponding to the M sequence number identifiers respectively; and receiving a fifth input of the user for the selection control; and the program or the instruction, when executed by the processor, causes the electronic device to perform:

in response to the fifth input, selecting, from the target text, and marking the target content based on the pieces of content corresponding to the M sequence number identifiers.

7. An electronic device, comprising a processor, a memory, and a program or an instruction stored in the memory and executable on the processor, wherein the program or the instruction, when executed by the processor, causes the electronic device to perform:

receiving a first input of a user for target text in a first interface;

in response to the first input, displaying a target information input box on the first interface, wherein the target information input box is used for the user to input key information;

receiving a second input of the user, wherein the second input is an input of the user for at least one piece of key information in the target information input box;

in response to the second input, displaying N sequence number identifiers on N pieces of content, wherein the N pieces of content are pieces of content corresponding to the at least one piece of key information in the target text, the N pieces of content are in a one-to-one correspondence with the N sequence number identifiers, and N is a positive integer;

receiving a third input of the user for M sequence number identifiers among the N sequence number identifiers, wherein M is a positive integer less than or equal to N; and in response to the third input, selecting, from the target text, and marking target content based on pieces of content corresponding to the M sequence number identifiers;

wherein to select from the target text and mark the target content, the electronic device is configured to perform:

in a case that the M sequence number identifiers are one sequence number identifier, determining all pieces of content between content corresponding to the one sequence number identifier and content corresponding to a last sequence number identifier among the N sequence number identifiers as the target content, and marking the target content; and in a case that the M sequence number identifiers are a plurality of sequence number identifiers, determining all pieces of content between content corresponding to a first sequence number identifier among the plurality of sequence number identifiers and content corresponding to a last sequence number identifier among the plurality of sequence number identifiers as the target content, and marking the target content;

wherein the content corresponding to the first sequence number identifier is the same as the content corresponding to the last sequence number identifier; and the program or the instruction, when executed by the processor, causes the electronic device to perform:

splitting the content corresponding to the first sequence number identifier to obtain a first part of content and a second part of content, and marking the first part of content with a first color;

splitting the content corresponding to the last sequence number identifier to obtain a third part of content and a fourth part of content, and marking the fourth part of content with a second color; and determining all pieces of content between the first part of content and the fourth part of content as the target content.

8. The electronic device according to claim 7, wherein the first interface further comprises a sequence number control; and the program or the instruction, when executed by the processor, causes the electronic device to further perform:

receiving a fourth input of the user for the sequence number control; and displaying a target window in response to the fourth input, wherein the target window comprises the N sequence number identifiers, wherein the fourth input is an input of the user for the M sequence number identifiers in the target window.

9. The electronic device according to claim 7, wherein the first interface further comprises a selection control; and the program or the instruction, when executed by the processor, causes the electronic device to further perform:

marking the pieces of content corresponding to the M sequence number identifiers respectively; and receiving a fifth input of the user for the selection control; and the program or the instruction, when executed by the processor, causes the electronic device to perform:

in response to the fifth input, selecting, from the target text, and marking the target content based on the pieces of content corresponding to the M sequence number identifiers.

10. A computer program product, wherein the program product is executed by at least one processor to implement the text content selection method according to claim 1.

11. A computer program product, wherein the program product is executed by at least one processor to implement the text content selection method according to claim 2.

12. A computer program product, wherein the program product is executed by at least one processor to implement the text content selection method according to claim 3.

* * * * *